(12) United States Patent
Xiao

(10) Patent No.: US 10,377,474 B2
(45) Date of Patent: Aug. 13, 2019

(54) BLADE GUARD REMOVABLE STRUCTURE FOR AEROCRAFT

(71) Applicant: Guangdong Syma Model Aircraft Industrial Co., Ltd., Shantou, Guandong Province (CN)

(72) Inventor: Jiongliang Xiao, Shantou (CN)

(73) Assignee: GUANGDONG SYMA MODEL AIRCRAFT INDUSTRIAL CO., LTD, Shantou, Guangdong Province (CN)

(*) Notice: Subject to any disclaimer, the term of this patent is extended or adjusted under 35 U.S.C. 154(b) by 376 days.

(21) Appl. No.: 15/356,513

(22) Filed: Nov. 18, 2016

(65) Prior Publication Data

US 2017/0203836 A1    Jul. 20, 2017

(30) Foreign Application Priority Data

Jan. 20, 2016 (CN) .......................... 2016 1 0036469

(51) Int. Cl.
*B64C 27/00* (2006.01)
*B64C 39/02* (2006.01)

(52) U.S. Cl.
CPC .......... *B64C 27/006* (2013.01); *B64C 39/024* (2013.01); *B64C 2201/024* (2013.01)

(58) Field of Classification Search
CPC ............... B64C 27/006; B64C 39/024; B64C 2201/024; B64C 27/08; B64C 2201/108; B64C 2201/123; F04D 29/34; F04D 25/088; F04D 29/70; F04D 29/701; F04D 29/703

See application file for complete search history.

(56) References Cited

U.S. PATENT DOCUMENTS

2015/0321759 A1* 11/2015 Caubel ................. B64C 39/024
                                                          244/17.23
2017/0043869 A1*  2/2017 Howard ............... B64C 39/024
2017/0144753 A1*  5/2017 Yu ........................ B64C 39/024

* cited by examiner

*Primary Examiner* — Jason D Shanske
*Assistant Examiner* — Eric J Zamora Alvarez
(74) *Attorney, Agent, or Firm* — Sinorica, LLC

(57) ABSTRACT

A blade guard removable structure for an aerocraft has a connecting base, a blade guard and an elastic limiting strip. The blade guard has an insert. The connecting base has a receptacle for allowing the insert to be inserted therein. The limiting strip has an inner end. The inner end is connected to the insert. The limiting strip has a protruded fastener, an extension portion and an outer end. The protruded fastener is disposed on the extension portion. The protruded fastener is located at the outer end. The connecting base has a limiting recess for limiting the protruded fastener. The limiting strip is located in between the blade guard and the limiting recess.

9 Claims, 4 Drawing Sheets

BLADE GUARD REMOVABLE STRUCTURE FOR AEROCRAFT

CROSS-REFERENCE TO RELATED APPLICATIONS

This application claims benefit and priority to Chinese patent application No. 201610036469.X, which was filed on Jan. 20, 2016; the contents of which are incorporated by reference herein in its entirety.

TECHNICAL FIELD

The present invention relates to the technical field of aerocrafts and in particular to a blade guard removable structure for an aerocraft.

BACKGROUND OF THE PRESENT INVENTION

Nowadays, with the progress of production and manufacturing technologies, a large number of small unmanned aerocrafts have been applied in various fields, for example, applied in aerial photography, exploration and by flight enthusiasts. These unmanned aerocrafts include single-rotor, multi-rotor and four-axis aerocrafts. Majority of these aerocrafts are manipulated by untrained non-professional users. During the manipulation of flying, it is very likely to cause a case where rotors stop rotating. However, due to the limited flight height of these aerocrafts and different manipulation abilities of the users, especially for new beginners, the aerocrafts often fall down to the ground rapidly during test flights. In order to prevent the damage to the rotors from this sharp falling, aerocraft manufacturers often additionally provide corresponding blade guards around the rotors, so that the rotors may be protected by the guards when the aerocrafts fall down to the ground. The existing blade guard is generally mounted in two ways: first, the guard is connected to an aerocraft body by screws; and second, the guard is in snap connection to an aerocraft body. In the first way, apparently, corresponding tools are required to assemble or disassemble, and both the assembly and the disassembly are inconvenient; while in the second way, although the assembly is simple, the disassembly cannot be realized, and accordingly, the large space usage is not convenient for transportation and packaging. In view of this, some improvements are made thereto by the inventor(s).

SUMMARY OF THE PRESENT INVENTION

In view of the deficiencies of the prior art, an objective of the present invention is to provide a blade guard removable structure for an aerocraft. The removable structure has the advantages of repeatable disassembly, and convenient assembly and quick disassembly.

For this purpose, the present invention provides a blade guard removable structure for an aerocraft, including a connecting base for connecting to the aerocraft, further including a blade guard and an elastic limiting strip; the blade guard has at least one insert, and an receptacle for allowing the insert to be inserted therein is provided on the connecting base; an inner end of the limiting strip is connected to the insert, while a protruded fastener is provided on an extension portion at an outer end of the limiting strip; and, a limiting recess for limiting the protruded fastener is provided on the connecting base, and the limiting strip is located between the blade guard and the limiting recess.

Preferably, an internal connecting hole is provided on the insert, and an internal connecting column extending into the internal connecting hole is provided at the inner end of the limiting strip.

Further, the internal connecting hole is a circular, square or polygonal hole.

Further, the cross-section of the protruded fastener is triangular, and the protruded fastener is protruded downward to abut against the limiting recess for limitation.

Further, the internal connecting hole is a through hole, the internal connecting column passes through the through hole and extends outward; and, an upper baffle for abutting against the insert and obstructing the internal connecting column is provided at the receptacle.

Preferably, a deformation gap D for allowing the limiting strip to be deformed elastically is provided on the blade guard.

Further, an upper surface of the deformation gap D is a fitting surface which is a curved surface or a stepped settlement surface.

Further, an elastic element for abutting against the fitting surface is provided on the extension portion at the outer end of the limiting strip.

Further, the elastic element is a spring, or an elastic sheet integrated with the limiting strip.

Preferably, two inserts are provided on the blade guard, and two receptacles for allowing the inserts to be inserted therein are provided on the connecting base.

The present invention has the following beneficial effects: compared with the prior art, the present invention provides a blade guard removable structure for an aerocraft, including a connecting base for connecting to the aerocraft and further including a blade guard and an elastic limiting strip, with the blade guard having at least one insert. With the removable structure, the blade guard can be quickly connected to the connecting base, and the connection stability is excellent due to the limitation of the limiting strip to the blade guard. When it is required to disassemble the blade guard, the protruded fastener is separated from the limiting recess by pressing the limiting strip, so that the blade guard together with the limiting strip can be pulled out from the connecting base. Accordingly, the space is saved, and it is advantageous for transportation and packaging. In conclusion, the removable structure has the advantages of repeatable disassembly, and convenient assembly and quick disassembly.

BRIEF DESCRIPTION OF THE DRAWINGS

FIG. 7 is a schematic diagram of connecting a limiting strip having a spring with a blade guard, according to the present invention, in which:

Figure 1:
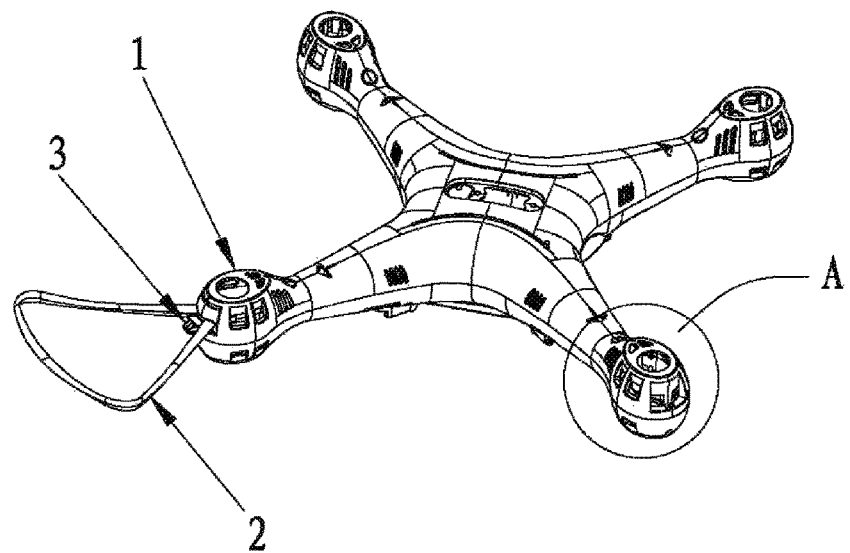
FIG. 1 is a structure diagram of connecting a blade guard removable structure of the present invention with an aerocraft.
Figure 2:
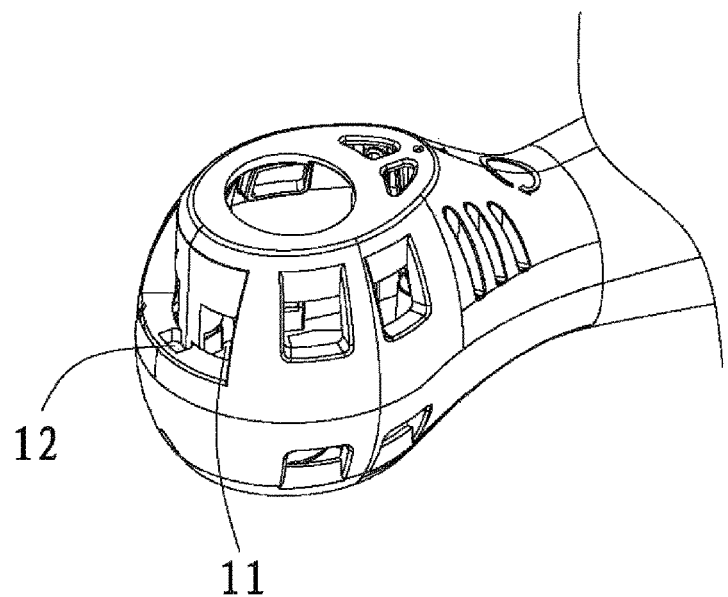
FIG. 2 is an enlarged structure diagram of part A in FIG. 1.
Figure 3:
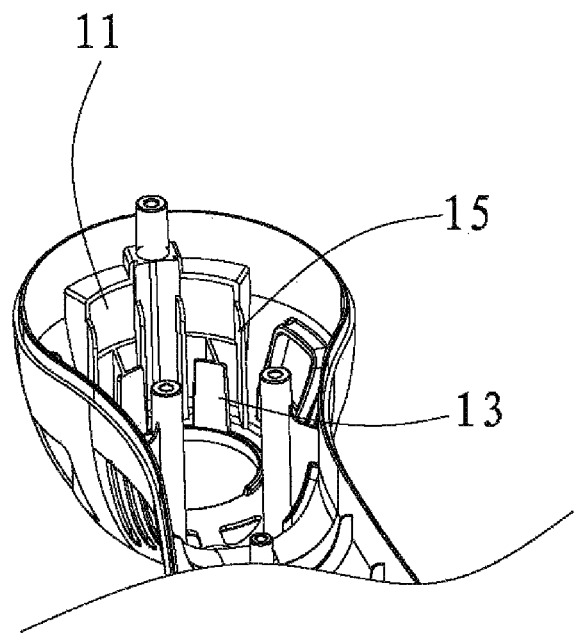
FIG. 3 is an internal structure diagram of a connecting base according to the present invention.
Figure 4:
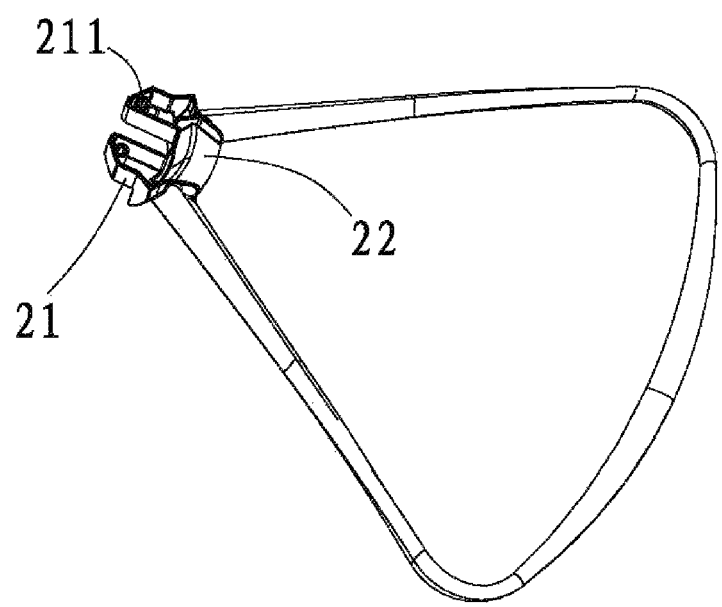
FIG. 4 is a structure diagram of a blade guard according to the present invention.
Figure 5:
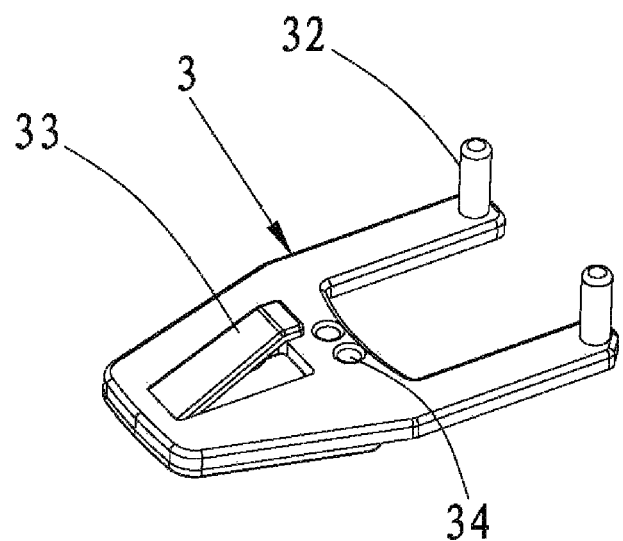
FIG. 5 is a structure diagram of a limiting strip according to the present invention.

1: connecting base;

11: receptacle;
12: limiting recess;
13: upper baffle;
14: lower baffle;
15: guide plate;
2: blade guard;
21: insert;
211: internal connecting hole;
22: fitting surface;
3: limiting strip;
31: protruded fastener;
32: internal connecting column;
33: elastic element;
331: spring;
332: elastic sheet; and
34: glue reducing hole.

DETAILED DESCRIPTION OF THE PRESENT INVENTION

The present invention will be described below in details with reference to the accompanying drawings.

With reference to FIGS. 1 to 7, a blade guard removable structure for an aerocraft is provided, including a connecting base 1 for connecting to the aerocraft. The blade guard removable structure further includes a blade guard 2 and an elastic limiting strip 3. The blade guard 2 has at least one insert 21, and a receptacle 11 for allowing the insert 21 to be inserted therein is provided on the connecting base 1. An inner end of the limiting strip 3 is connected to the insert 21, while a protruded fastener 31 is provided on an extension portion at an outer end of the limiting strip 3. A limiting recess 12 for limiting the protruded fastener 31 is provided on the connecting base 1, and the limiting strip 3 is located between the blade guard 2 and the limiting recess 12. When it is required to assemble the blade guard 2, the limiting strip 3 is fitted with the blade guard 2, so that the insert 21 and the limiting strip 3 are synchronously inserted into the receptacle 11, and the protruded fastener 31 is located in the limiting recess 12. In this way, the blade guard 2 is assembled. When it is required to disassemble the blade guard 2, the protruded fastener 31 is separated from the limiting recess 12 by pressing the limiting strip 3, so that the blade guard 2 together with the limiting strip 3 can be pulled out from the connecting base 1. In this way, the blade guard 2 is disassembled. With the removable structure, the blade guard 2 can be quickly connected to the connecting base 1, and the connection stability is excellent due to the limitation of the limiting strip 3 to the blade guard 2. Upon the completion of disassembly, the space is saved, and it is advantageous for transportation and packaging. In conclusion, the removable structure has the advantages of repeatable disassembly, and convenient assembly and quick disassembly.

This solution further provides a most convenient way of connecting the limiting strip 3 with the insert 21: an internal connecting hole 211 is provided on the insert 21, and an internal connecting column 32 extending into the internal connecting hole 211 is provided at the inner end of the limiting strip 3. Such a column-hole fitting structure is advantageous for quick assembly. Of course, equivalent snap connection or other ways may also be used and will not be listed here.

In this solution, the internal connecting hole 211 is a circular, square or polygonal hole. Correspondingly, the internal connecting column 32 is most preferably a cylindrical, square or polygonal column, which is matched with the internal connecting hole 211. Meanwhile, the internal connecting column 32 is in clearance fit to the internal connecting hole 211, it is thus convenient for assembly and disassembly.

In this technical solution, the cross-section of the protruded fastener 31 is triangular, and the protruded fastener 31 is protruded downward to abut against the limiting recess 12 for limitation. During the disassembly of the blade guard 2, firstly, the outer end portion of the limiting strip 3 is pressed so that the abutting of the protruded fastener 31 against the limiting recess 12 is relieved. In this way, the blade guard 2 can be pulled out. However, during the assembly, the limiting strip 3, together with the insert 21, is inserted into the receptacle 11, so that the protruded fastener 31 is allowed to abut against the limiting recess 12 to form the limitation. Apparently, the protruded fastener 31 with the triangular cross-section exhibits excellent abutting effect. It is to be noted that, when the protruded fastener 31 is plastically integrated with the limiting strip 3, a glue reducing hole 34 is provided on the surface of the protruded fastener 31, so that it is advantageous to form the protruded fastener 31 and the forming quality is better.

In this technical solution, the internal connecting hole 211 is a through hole, the internal connecting column 32 passes through the internal connecting hole 211 and extends outward; and, an upper baffle 13 for abutting against the insert 21 and obstructing the internal connecting column 32 is provided at the receptacle 11. The internal connecting column 32 passes through the internal connecting hole 211 and extends outward. The formed extension portion is a small portion which is most preferably 0.5 mm to 1 mm It is undesirable to have an overlarge orifice of the receptacle 11 due to excessive extension. It is found in measurements that the height of the extension portion is optimally 0.7 mm. The upper baffle 13 may obstruct the insertion of the insert 21 and the limiting strip 3. In addition, the upper baffle 13 may also provide longitudinal resisting effect on the insert 21. Of source, more preferably, guide plates 15 for guiding and limiting the insertion of the limiting strip 3 and the insert 21 are provided on two sides of the receptacle 11, a lower baffle 14 for abutting against the limiting strip 3 is provided below the receptacle 11, and the lower baffle 14 is matched with the upper baffle 13, so that the close fit of the inner end of the limiting strip 3 and the insert 21 is ensured.

Figure 6:
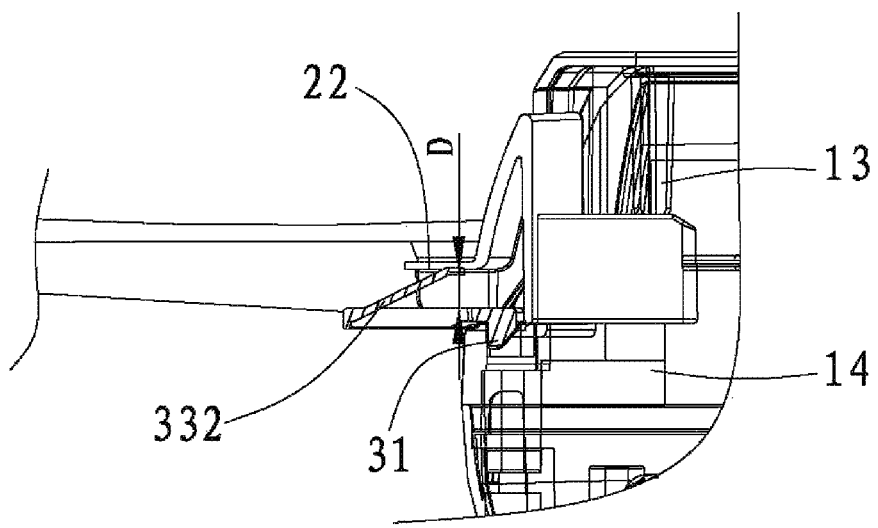
FIG. 6 is a schematic diagram of connecting a limiting strip having an elastic sheet with a blade guard, according to the present invention.
Figure 7:
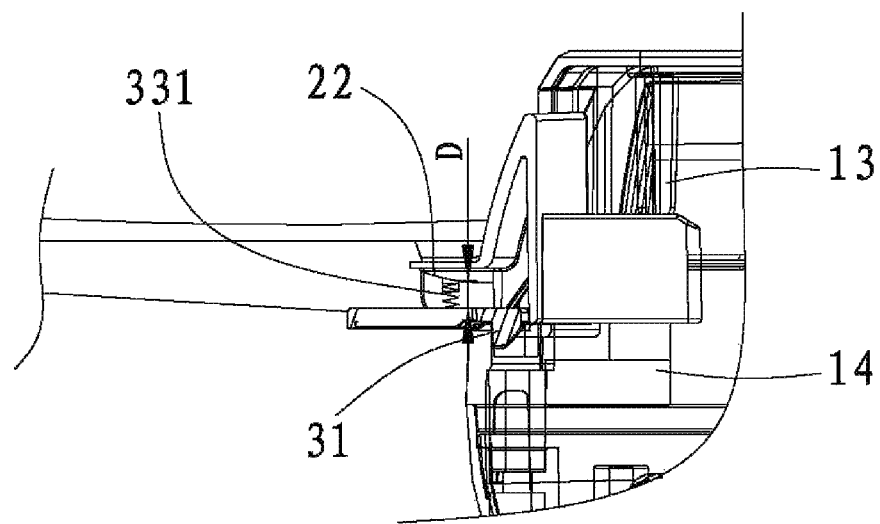

Referring to FIGS. 6 and 7, in this technical solution, a deformation gap D for allowing the limiting strip 3 to be deformed elastically is provided on the blade guard 2. When it is required to disassemble the blade guard 2, the limiting strip 3 is pressed and allowed to be deformed along the deformation gap D, so that the protruded fastener 31 is speared from the limiting recess 12. Consequently, the insert 21 may be pulled out, and the blade guard 2 may be disassembled.

In this solution, the deformation gap D may be formed in the following ways. In the first way, an upper surface of the deformation gap D is a fitting surface 22 which is a curved surface, and this curved surface may be integrally formed by a mould. This way is simple, convenient and highly practical. In the second way, the upper surface of the deformation gap D is a fitting surface 22 which is a stepped settlement surface. The settlement surface forms the deformation gap D merely together with a corresponding portion of the protruded fastener 31, so that a larger contact area between the limiting strip 3 and the blade guard 2 may be better ensured, and the connection fastness may be excellent.

In this technical solution, in order to prevent the limiting strip 3 from being deformed due to unexpected external force factors, an elastic element 33 for abutting against the fitting surface 22 is provided on the extension portion at the outer end of the limiting strip 3. This elastic element 33 is located between the limiting strip 3 and the blade guard 2 to form elastic cushioning, so that the deformation of the limiting strip 3 resulted from the unexpected external force factors is reduced.

In this solution, the elastic element 33 is a spring 331, or an elastic sheet 332 integrated with the limiting strip 3. When the elastic element 33 is the spring 331 (referring to FIG. 7), the spring 331 is fixedly connected to the limiting strip 3. After mounted, the upper end of the spring 331 abuts against the deformation gap D of the blade guard 2. When the elastic element 33 is the elastic sheet 332 (referring to FIG. 6), it is most preferably integrally formed by injection molding, so that the corresponding procedures may be reduced and the manufacturing cost may be saved.

In this technical solution, two inserts 21 are provided on the blade guard 2, and two receptacles 11 for allowing the inserts 21 to be inserted therein are provided on the connecting base 1. By fitting the two inserts 21 and the two receptacles 11, the structure is more compact. Moreover, when one insert 21 is damaged, the other insert 21 may still play a connection role, so that the use is more reliable.

The foregoing descriptions merely show preferred embodiments of the present invention. A person of ordinary skill in the art may make alterations to the specific implementations and the range of application on the basis of the concepts of the present invention. The contents of the present description shall not be interpreted as limitations to the present invention.

The invention claimed is:

1. A blade guard removable structure for an aerocraft comprising: a connecting base (1) for connecting to the aerocraft; a blade guard (2); an elastic limiting strip (3); the blade guard (2) comprising an insert (21); the connecting base (1) comprising a receptacle (11) for allowing the insert (21) to be inserted therein; the limiting strip (3) comprising an inner end; the inner end being connected to the insert (21); the limiting strip (3) comprising a protruded fastener (31), an extension portion and an outer end; the protruded fastener (31) being disposed on the extension portion; the protruded fastener (31) being located at the outer end; the connecting base (1) comprising a limiting recess (12) for limiting the protruded fastener (31); the limiting strip (3) being located in between the blade guard (2) and the limiting recess (12); the insert (21) comprising an internal connecting hole (211); the limiting strip (3) comprising an internal connecting column (32); the internal connecting column (32) extending into the internal connecting hole (211); and the internal connecting column (32) being located at the inner end.

2. The blade guard removable structure for an aerocraft according claim 1 comprising: the internal connecting hole (211) a circular hole, a square hole or a polygonal hole.

3. The blade guard removable structure for an aerocraft according to claim 1 comprising: a cross-section of the protruded fastener (31) being triangular; the protruded fastener (31) being protruded downward to abut against the limiting recess (12).

4. The blade guard removable structure for an aerocraft according to claim 1 comprising: the internal connecting hole (211) being a through hole; the internal connecting column (32) passing through the internal connecting hole (211) and extending outward; the connecting base (1) comprising an upper baffle (13) for abutting against the insert (21) and obstructing the internal connecting column (32); and upper baffle (13) being disposed on the receptacle (11).

5. The blade guard removable structure for an aerocraft according to claim 1 comprising: the blade guard (2) comprising a deformation gap (D) for allowing the limiting strip (3) to be deformed elastically.

6. The blade guard removable structure for an aerocraft according to claim 5 comprising: the deformation gap (D) comprising an upper surface; the upper surface being a fitting surface (22); and the fitting surface (22) being a curved surface or a stepped settlement surface.

7. The blade guard removable structure for an aerocraft according to claim 6 comprising: the limiting strip (3) comprising an elastic element (33) for abutting against the fitting surface (22); elastic element (33) being disposed on the extension portion; and elastic element (33) being located at the outer end.

8. The blade guard removable structure for an aerocraft according to claim 7 comprising: the elastic element (33) being a spring (331) or an elastic sheet (332); and the elastic element (33) being integrated with the limiting strip (3).

9. The blade guard removable structure for an aerocraft according to claim 1 comprising: the blade guard (2) comprising another insert (21); the another insert (21) being disposed on the blade guard (2); and the connecting base (1) comprising another receptacle (11) for allowing the another insert (21) to be inserted therein.

* * * * *